(12) United States Patent
Greenspan et al.

(10) Patent No.: US 10,397,311 B2
(45) Date of Patent: Aug. 27, 2019

(54) DATA COLLECTION AND ESTIMATION USING AN INTERNET OF THINGS

(71) Applicant: CA, Inc., New York, NY (US)

(72) Inventors: Steven L. Greenspan, Scotch Plains, NJ (US); Victor Muntés Mulero, Barcelona (ES); Marc Solé Simo, Barcelona (ES)

(73) Assignee: CA, Inc., New York, NY (US)

( * ) Notice: Subject to any disclaimer, the term of this patent is extended or adjusted under 35 U.S.C. 154(b) by 147 days.

(21) Appl. No.: 15/238,141

(22) Filed: Aug. 16, 2016

(65) Prior Publication Data

US 2018/0054472 A1   Feb. 22, 2018

(51) Int. Cl.
| | | |
|---|---|---|
| *G06F 15/173* | (2006.01) | |
| *H04L 29/08* | (2006.01) | |
| *H04L 29/06* | (2006.01) | |
| *H04L 12/721* | (2013.01) | |

(52) U.S. Cl.
CPC ............ *H04L 67/10* (2013.01); *H04L 45/123* (2013.01); *H04L 67/02* (2013.01); *H04L 67/42* (2013.01)

(58) Field of Classification Search
CPC ................................ H04L 67/10; H04L 67/02
See application file for complete search history.

(56) References Cited

U.S. PATENT DOCUMENTS

2017/0264710 A1* 9/2017 Muntes Mulero .... H04L 67/327

OTHER PUBLICATIONS

Anaya, Ivan Dario Paez, "Integrating Predictive Analysis in Self-Adaptive Pervasive Systems", Dissertation, Univertite Rennes 1, 2015, 147 pages.

* cited by examiner

*Primary Examiner* — Hua Fan
(74) *Attorney, Agent, or Firm* — Sage Patent Group

(57) ABSTRACT

A thing-sourcing project request including requirements for a thing-sourcing task that requires data input by a thing-sourcing device is received from a requestor device. A determination is made if real-time data is needed in order to complete the thing-sourcing task. In response to determining that real-time data is not needed, a determination is made if a similar thing-sourcing task has been previously completed. If not, the method determines if the thing-sourcing task can be completed using pre-existing data. If so, a data archive is searched for relevant pre-existing data that can be used to complete the thing-sourcing task. The thing-sourcing task is completed using the relevant pre-existing data, and a response to the thing-sourcing project request is transmitted to the requestor device.

20 Claims, 8 Drawing Sheets

DATA COLLECTION AND ESTIMATION USING AN INTERNET OF THINGS

BACKGROUND

Various embodiments described herein relate to networks of electronic devices, and more particularly to thing-sourcing systems, devices, methods and computer program products.

Crowdsourcing is a type of participative online activity in which an individual or entity proposes to a group of individuals of varying knowledge, heterogeneity, and number, via a flexible open call, the voluntary undertaking of a task. In crowd-sourcing, an individual communicates with a crowd-sourcing platform via a user device that is connected to a network such as the Internet. Crowdsourcing may be used to obtain needed services, ideas and/or content by soliciting contributions from a large group of people, and especially from an online community.

The Internet of Things (IoT) refers to a network of physical and virtual things having embedded computer systems associated therewith that allow the things to exchange data with other entities, such as a user, operator, manufacturer, technician, analyst, etc. based on the International Telecommunication Union's Global Standards Initiative. The IoT may allow, for example, things to be sensed, monitored, and/or controlled remotely across existing network infrastructure, which may create more opportunities for direct integration between the physical world and computer-based systems, and may result in improved efficiency, accuracy, and economic benefit Each thing may be uniquely identifiable through its associated embedded computing system and is able to interoperate within the existing Internet infrastructure. Some experts estimate that the IoT will consist of almost 50 billion things by 2020. The things in the IoT can refer to a wide variety of device or object types such as, but not limited to, industrial electronic devices, environmental sensors, security devices, power plant control/monitoring systems, airplane engine and flight control monitoring systems, railway control and monitoring systems, manufacturing control systems, and the like.

SUMMARY

A method includes receiving, at a computing device including a processor and a communication interface, a thing-sourcing project request from a requestor device over an electronic communication network, the thing-sourcing project request including requirements for a thing-sourcing task that requires data input by a thing-sourcing device, and determining if real-time data is needed in order to complete the thing-sourcing task. In response to determining that real-time data is not needed in order to complete the thing-sourcing task, the method determines if a similar thing-sourcing task has been previously completed. In response to determining that the similar thing-sourcing task has not been previously completed, the method determines if the thing-sourcing task can be completed using pre-existing data. In response to determining that the thing-sourcing task can be completed using pre-existing data, the method includes searching a data archive for relevant pre-existing data that can be used to complete the thing-sourcing task, completing the thing-sourcing task using the relevant pre-existing data, and transmitting a response to the thing-sourcing project request to the requestor device over the electronic communication network.

The pre-existing data may include data obtained from other data collection/estimation tasks.

The step of determining if real-time data is required in order to complete the thing-sourcing task may include determining if new real-time data is required in order to complete the thing-sourcing task.

The method may further include, in response to determining that real-time data is needed in order to complete the thing-sourcing task, posting requirements for the thing-sourcing task to thing-sourcing participant devices over the electronic communication network, receiving from a first group of the thing-sourcing participant devices over the electronic communication network, electronic requests to participate in the thing-sourcing task, selecting from the first group of the thing-sourcing participant devices, a second group of the thing-sourcing participant devices that can collectively accomplish the thing-sourcing task, coordinating execution of the thing-sourcing task by the second group of the thing-sourcing participant devices, receiving new real-time data from the second group of the thing-sourcing participant devices as a result of execution of the thing-sourcing task, generating a response to the thing-sourcing project request using the new real-time data received from the second group of thing-sourcing participant devices, and transmitting the response to the requestor device over the electronic communication network.

The method may further include posting the requirements for the thing-sourcing task is performed by a thing-sourcing platform that is connected to the thing-sourcing participant devices by the electronic communication network, receiving the electronic requests to participate in the thing-sourcing task is performed by the thing-sourcing platform in response to the electronic requests that are received by the thing-sourcing platform from the first group of the thing-sourcing participant devices over the electronic communication network, wherein the selecting is performed by the thing-sourcing platform, and wherein the coordinating is performed by the thing-sourcing platform.

The step of selecting the second group of thing-sourcing devices may include identifying a set of conditions that are required to accomplish the task, and identifying respective subsets of the set of conditions that are satisfied by respective thing-sourcing participant devices in the first group of the thing-sourcing participant devices, to identify the second group of the thing-sourcing participant devices that can collectively accomplish the set of conditions.

The method may further include, in response to determining that the thing-sourcing task has been previously completed, identifying previously generated data that was generated in a previous execution of the thing-sourcing task, obtaining data sampling requirements for the thing-sourcing task, determining if the previously generated data was generated in accordance with the data sampling requirements for the thing-sourcing task, and, in response to determining that the previously generated data was generated in accordance with the data sampling requirements for the thing-sourcing task, generating a response to the thing-sourcing project request using the previously generated data, and transmitting the response to the requestor device over the electronic communication network.

The method may further include, in response to determining that the task cannot be completed using pre-existing data, determining if at least one thing-sourcing participant device is available that can collect data needed to complete the thing-sourcing task.

The method may further include, in response to determining that at least one thing-sourcing participant device is available that can collect data needed to complete the thing-sourcing task, posting requirements for the thing-sourcing task to a plurality of thing-sourcing participant devices, receiving data from at least one of the plurality of thing-sourcing participant devices as a result of execution of the thing-sourcing task, generating a response to the thing-sourcing project request using the data provided by the at least one of the plurality of thing-sourcing participant devices, and transmitting the response to the requestor device over the electronic communication network.

The method may further include, in response to determining that no thing-sourcing participant device is available that can collect data needed to complete the thing-sourcing task, generating a negative response to the thing-sourcing project request and transmitting the negative response to the requestor device over the electronic communication network.

The method may further include, in response to determining that real-time data is required in order to complete the thing-sourcing task, determining if the required real-time data can be estimated based on previously-generated data, in response to determining that the required data can be estimated based on previously-generated data searching a data archive for pre-existing data that can be used to complete the thing-sourcing task, obtaining new real-time data from thing-sourcing participant devices, combining the pre-existing data with the new real-time data, generating a response to the thing-sourcing project request using the combined new real-time data and pre-existing data, and transmitting the response to the requestor device over the electronic communication network.

The method may further include, in response to determining that real-time data is required in order to complete the thing-sourcing task, determining if the required real-time data can be estimated based on related real-time data that is related to the required real-time data and that can be obtained from thing-sourcing participant devices, in response to determining that the required real-time data can be estimated based on the related real-time data, obtaining the related real-time data from the thing-sourcing participant devices, generating the required real-time data from the related real-time data, generating a response to the thing-sourcing project request using the required real-time data that is generated from the related real-time data, and transmitting the response to the requestor device over the electronic communication network.

At least one of the thing-sourcing participant devices may include a user device that communicates with the thing-sourcing platform over the electronic communication network in response to a user input, and at least one of the thing-sourcing participant devices may include an electronic device that automatically communicates with the thing-sourcing platform over the electronic communication network.

The electronic device may automatically communicate with the thing-sourcing platform over the network using a software agent that is configured to negotiate with the thing-sourcing platform, the portion of the task that can be accomplished by the electronic device.

The electronic device may include a thing in an Internet of Things (IoT).

Some embodiments provide a computer program including a computer readable storage medium having computer readable program code embodied in the medium, that is executable to cause a computer system to perform operations including receiving, over an electronic communication network, a thing-sourcing project request from a requestor device, the thing-sourcing project request including requirements for a thing-sourcing task that requires data input by a thing-sourcing device, determining if real-time data is needed in order to complete the thing-sourcing task, in response to determining that real-time data is not needed in order to complete the thing-sourcing task, determining if the thing-sourcing task has been previously completed, in response to determining that the thing-sourcing task has not been previously completed, determining if the task can be completed using pre-existing data, in response to determining that the task can be completed using pre-existing data, searching a data archive for pre-existing data that can be used to complete the thing-sourcing task, completing the thing-sourcing task using the pre-existing data, and transmitting a response to the thing-sourcing project request to the requestor device over the electronic communication network.

The operations may further include, in response to determining that real-time data is required in order to complete the thing-sourcing task, posting requirements for the thing-sourcing task to thing-sourcing participant devices over the electronic communication network, receiving from a first group of the thing-sourcing participant devices over the electronic communication network, electronic requests to participate in the thing-sourcing task, selecting from the first group of the thing-sourcing participant devices, a second group of the thing-sourcing participant devices that can collectively accomplish the thing-sourcing task, coordinating execution of the thing-sourcing task by the second group of the thing-sourcing participant devices, receiving real-time data from the second group of the thing-sourcing participant devices as a result of execution of the thing-sourcing task, generating a response to the thing-sourcing project request using the real-time data provided by the second group of thing-sourcing participant devices, and transmitting the response to the requestor device over the electronic communication network.

The operations may further include in response to determining that the thing-sourcing task has been previously completed, identifying previously generated data that was generated in a previous completion of the thing-sourcing task, obtaining data sampling requirements for the thing-sourcing task, determining if the previously generated data was generated in accordance with the data sampling requirements for the thing-sourcing task, and in response to determining that the previously generated data was generated in accordance with the data sampling requirements for the thing-sourcing task, generating a response to the thing-sourcing project request using the previously generated data, and transmitting the response to the requestor device over the electronic communication network.

A computer system according to some embodiments includes a processor, and a memory coupled to the processor, the memory including computer readable program code embodied therein that is executable to cause the computer system to perform operations including receiving, over an electronic communication network, a thing-sourcing project request from a requestor device, the thing-sourcing project request including requirements for a thing-sourcing task that requires data input by a thing-sourcing device, determining if real-time data is needed in order to complete the thing-sourcing task, in response to determining that real-time data is not needed in order to complete the thing-sourcing task, determining if the thing-sourcing task has been previously completed, in response to determining that the thing-sourcing task has not been previously completed, determining if the task can be completed using pre-existing data, in response to determining that the task can be completed using pre-existing data, searching a data archive for pre-existing data that can be used to complete the thing-sourcing task, completing the thing-sourcing task using the pre-existing data, and transmitting a response to the thing-sourcing project request to the requestor device over the electronic communication network.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects described herein are illustrated by way of example and are not limited by the accompanying figures, with like references indicating like elements.

DETAILED DESCRIPTION

Figure 1:
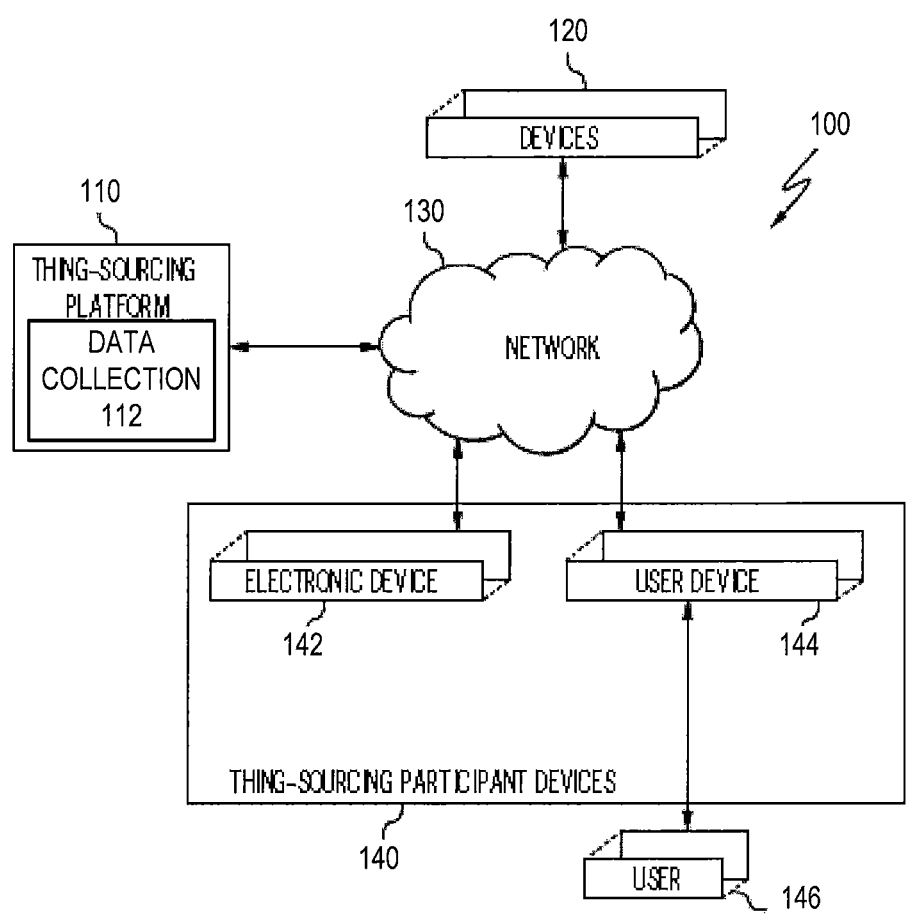
FIG. 1 is a block diagram of a thing-sourcing environment for coordinating thing-sourcing according to various embodiments described herein.

Crowd-sourcing concepts may be extended to "thing-sourcing," in which tasks can be automatically performed by network connected devices without the need for user interaction. The thing-sourcing participants can include electronic devices that automatically communicate with a thing-sourcing platform via a network. The electronic devices may include conventional computer systems or database management systems but can also include electronic devices in the Internet of Things (IoT), such as mobile phones, sensors, cameras, and other devices. Thing-sourcing participants can also include individuals that communicate with the thing-sourcing platform via a user device that is connected to the network. Thus, in some cases the concepts of crowd-sourcing and thing-sourcing can overlap.

Various embodiments described herein may arise from a recognition that new real-time data that is needed to complete a particular thing-sourcing task or project may not be readily available, either because not enough qualifying devices that could provide new real-time data are available, because the devices that are available do not meet requirements, such as data quality requirements, associated with the thing-sourcing project, and/or because the cost of obtaining new real-time data to complete the thing-sourcing project is prohibitively high.

Various embodiments described herein can overcome these potential difficulties by determining if new-real time data is required/desired to complete the thing sourcing project and, if new real-time data is not required, completing the thing-sourcing project using previously obtained data.

Thing-sourcing projects, or tasks, may be split in several sub-tasks, each one performed by a single device or micro-service. A thing-sourcing platform can manage the allocation of tasks, and can also track the reliability, accuracy, timeliness, and capabilities of the contributing devices. New real time data may be required for all sub-tasks of a thing-sourcing project, for none of the sub-tasks of the thing-sourcing project, or for only a portion of the sub-tasks of the thing-sourcing project.

There are a number of practical problems associated with the use of a thing-sourcing platform to obtain data. The reliability of the devices from which data is obtained may affect the value or utility of the data. For that reason, the reliability of the devices from which data is obtained may be ascertained, or at least estimated. There may be a cost associated with using some types of devices to collect data in a thing-sourcing environment. It may therefore be desirable to understand the cost structure associated with using various devices to fulfill a thing-sourcing task.

From a data collection and processing standpoint, it is also desirable to know whether some of the thing-sourcing devices over-sampled or under-sampled, or if the device needs to be recalibrated. It may also be desirable to know the location and/or manufacturer of a particular device, as that information may be used to design a model for interpreting data from the device. According to some embodiments, equivalence classes can be defined for devices with the same manufacturer model number, geographic context, and configuration settings. This enables sampling and prediction methods that are not available in crowd-sourcing with humans.

A thing-sourcing platform according to some embodiments may support task allocation by providing, collecting and/or processing data that describes how various devices generate and report information. Such data may include performance characteristics (e.g., response frequency and accuracy, normal range of responses and response latencies based on manufacturer's norms and actual performance data, types of measurements provided), costs (e.g., subscription, micro-transaction fees), geographic factors (e.g., location/mobility), context (e.g., environment conditions), and/or controls (e.g., orientation, movement, and manipulation commands). A thing-sourcing platform according to some embodiments may also be able to calculate appropriate substitutions if a device is unavailable, and be able to generate the correct data subscription workflow. This information can be updated as real performance data is recorded and devices/services are reconfigured.

A thing-sourcing platform according to some embodiments may subscribe to published events from selected thing-sourcing devices, as well as to requests from application composers (requestor devices) and task brokers, which are described in more detail below. The data collected through such subscriptions may be used to construct a map from tasks to sub-tasks to instances of devices (that carry out the tasks) to the performance characteristics of the devices in the context of these tasks.

New application compositions may be matched to a previously recorded mapping, and performance of the new application can be estimated and tested for completeness and efficiency. In addition, optimal solutions (cost vs. quality) can be discovered, and the compositions themselves can be used as search vectors in data mining or process mining analytics. Data variation can be monitored and alarms/alerts can be sent to support IoT operations support. For instance, a task can be split according to some execution workflow of subtasks. Assume for example that a user of the thing-sourcing platform wants to know the temperature at a particular location. This can be split into two sequential subtasks, one to gather several temperature readings from sensors, and another that from these readings performs some computation to decide which is the likely temperature (e.g., computing the average of all the readings, discarding outliers, etc.). Each of these subtasks may have an associated cost/quality value. From these individual estimations a global estimation for the whole task can be computed.

As a second example, an application might provide estimates of soil humidity across a large set of independent farms. The cost of mapping and estimating soil humidity will depend upon several tasks: (1) determining what data is published at the required frequency with the required accuracy, (2) collecting the data from the various sources, (3) computing statistics based on the sample, and (4) visualizing the sample. The cost and quality of each task can be estimated from previously recorded data about these tasks, and the accuracy at differently sampling rates can be computed. This allows developers to optimize a solution for their use case, even if their use case differs from the previous use cases (but the use cases share common sub-tasks).

Notably, previously recorded data can be used to provide hybrid solutions in which some of the results returned to the task broker are real-time and some are estimates based on recent, but previously recorded measurements. This may enable, for example, predictions based on current measurements as well as alternate strategies for collecting data.

FIG. 1 is a block diagram of a thing-sourcing environment 100 for coordinating the execution of thing-sourcing projects according to various embodiments described herein. Referring now to FIG. 1, a thing-sourcing platform 110 is provided. The thing-sourcing platform 110 may be embodied as one or more enterprise, application, personal, pervasive and/or embedded computer systems that are operable to receive, transmit, process and/or store data using any suitable combination of software, firmware and/or hardware and that may be stand-alone or interconnected by any conventional public and/or private, real and/or virtual, wired and/or wireless network including all or a portion of the global communication network known as the Internet, and may include various types of tangible, non-transitory computer readable media. A more detailed embodiment of a thing-sourcing platform will be provided below.

The thing-sourcing platform 110 may include a data collection system, method and/or computer program product, collectively referred to herein as a "data collection module" 112, that can be used to coordinate thing-sourcing according to various embodiments described herein. The thing-sourcing platform 110 communicates with a plurality of requestor devices 120 and a plurality of thing-sourcing participant devices 140 over a network 130. The network 130 may be any conventional public and/or private, real and/or virtual, wired and/or wireless network including all or a portion of the Internet.

Still referring to FIG. 1, the plurality of requestor devices 120 communicate with the thing-sourcing platform 110 via the network 130. A given requestor device requests a thing-sourcing project from the thing-sourcing platform 110 by providing various information about the thing-sourcing project. In some embodiments, the requestor device 120 may define a task using a particular formal language and/or natural language. The requestor device may be responsive to a user (individual) that requests a task via a user device, an entity that requests a task and/or a computer system that requests a task.

Still referring to FIG. 1, a plurality of thing-sourcing participant devices 140 also communicate with the thing-sourcing platform 110. The thing-sourcing participant devices include a plurality of user devices 144, that communicate with the thing-sourcing platform 110 over the network 130, in response to input from users (individuals) 146, and also include a plurality of electronic devices 142 that automatically communicate with the thing-sourcing platform 110 via the network 130. A given user 146 may be associated with one or more user devices 144, and a given user device 144 may be associated with one or more users 146.

The user devices 144 may be embodied by mobile phones, tablets, laptop/desktop computers, and/or any other devices that are configured to provide an interface for connection to a network under control of a user 146. The electronic devices 142 may comprise things in the IoT. As used herein, a "thing," when referred to in context of the IoT, is an object of the physical world (physical thing) or an object of the information world (virtual thing), which is capable of being identified and integrated into a communication network. Things have associated information, which can be static and/or dynamic. A physical thing may be capable of a number of different operations or functions. For example, it may be capable of sensing some feature or property of itself or its surroundings (e.g., position, speed, temperature, humidity, etc.), it may be capable of being actuated, such as by a user, and/or it may be capable of being connected to a network and/or to other devices. Examples of physical things that may form part of the Internet of Things include, but are not limited to, an electronic sensor, a robot, a good, a product, and a piece of electrical equipment. A virtual thing may be capable of being stored and/or may be capable of being processed, and may be capable of being accessed. Examples of virtual things include, but are not limited to, multimedia content, application software stored in a memory and executed by a processor and a database management system.

The electronic devices 142 are configured to automatically communicate with the thing-sourcing platform 110 via the network 130 and may be embodied by one or more enterprise, application, personal, pervasive and/or embedded computer systems that are operable to receive, transmit, process and/or store data using any suitable combination of software, firmware, and/or hardware, and that may be stand-alone or interconnected by any conventional public and/or private, real and/or virtual network, wired and/or wireless network including the Internet, and may include various types of tangible, non-transitory computer readable medium. Moreover, in some embodiments, the electronic device 142 may communicate with the thing-sourcing platform 110 via the network 130 using a software agent that is included in the electronic device 142, in the thing-sourcing platform 110, and/or elsewhere in the thing-sourcing environment 100, and that is configured to negotiate with the thing-sourcing platform 110, the portion of the task that can be accomplished by the electronic device 142, credentials of the electronic device 142, and/or capabilities thereof.

Figure 2:
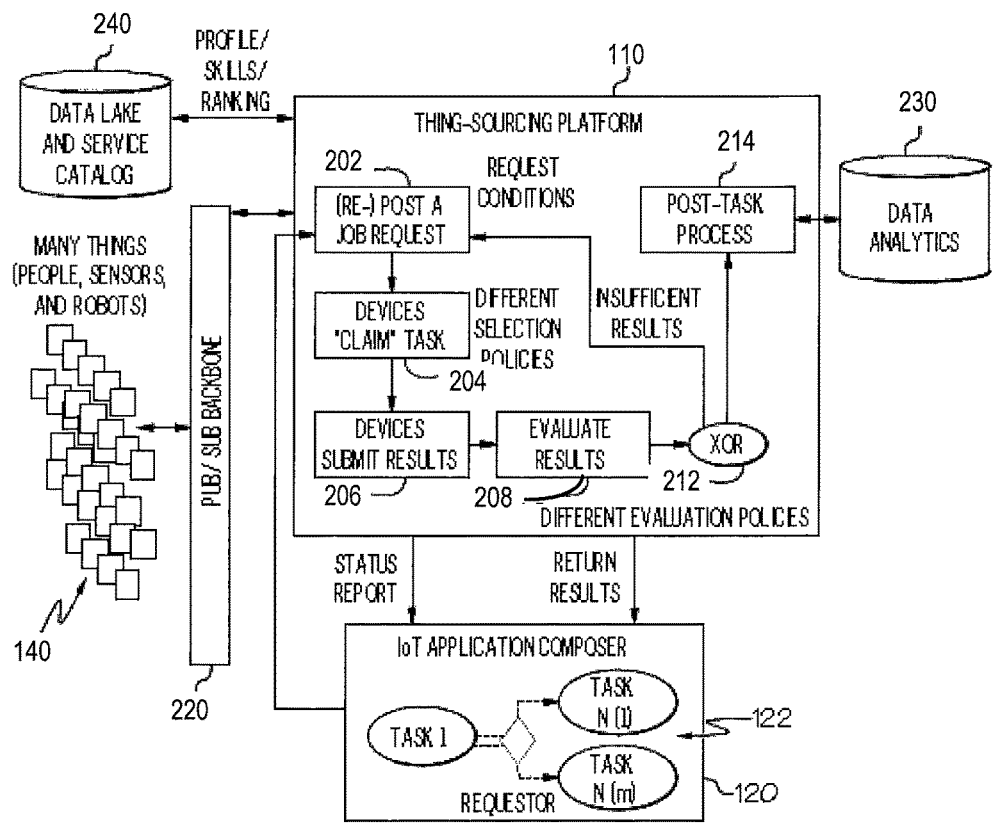
FIG. 2 is a block diagram of a generic architecture for a thing-sourcing platform that may be modified to perform coordinated thing-sourcing according to various embodiments described herein.

FIG. 2 depicts a generic architecture for a thing-sourcing platform 110 that can be used to provide thing-sourcing services according to various embodiments described herein. Analogously to a crowd-sourcing platform, in a thing-sourcing platform 110 a requester 120 defines a task 122 using a particular formal language and/or natural language. The task 122 is published as an open call by Block 202 and it is made available to thing-sourcing participant devices 140 in a connected ecosystem using a publication/subscription ("pub/sub") backbone 220. (A pub/sub system is a communications model in which one or more information consuming entities subscribe to data feeds published by one or more information generating entities.)

This connected ecosystem may also be called the Internet of Things. Thing-sourcing may also be called hybrid crowd-sourcing in other contexts.

The concept of a "worker requirement" in a crowdsourcing system used to accomplish a task may be defined as a set of constraints on the group of individuals allowed to choose to undertake the task. Constraints may be defined over any property of the profile of individuals (such as ratio of approved contributions, knowledge about a topic, age, gender and/or location), belonging to a group of individuals, or any combination (using conjunctions, disjunctions or negations). The same definition is used herein but is extended to electronic devices in a hybrid system where both human beings (via user devices) and electronic devices may collaborate together to solve a particular task. These user devices and electronic devices may also be collectively referred to as "agents". A property of the profile of an agent may be information about their skills, location, data quality, scores about the quality provided in previous task-solving processes, etc. One or more worker requirements may be imposed directly by a requestor device 120, in connection with a thing-sourced project request, and/or may be imposed by the thing-sourcing platform 110 based on an analysis of the task and/or data needed to complete the task.

A complex problem may be divided by the requestor device 120 into a composition of tasks 122, or a workflow. These tasks 122 are published on the pub/sub backbone 220 by Block 202 through open calls.

Still referring to FIG. 2, the thing-sourcing platform 110 also includes a Block 204 wherein devices may claim a task and a Block 206 where they may submit results. The results may provide a status report to the requestor 120. At Block 208, the results are evaluated and the results may be returned to the requestor 120. Block 212 determines whether the results are sufficient. If not, a job request may be reposted to Block 202. If the results are sufficient, post-task processes may be implemented at Block 214, for example using data analytics 230. The thing-sourcing platform may also rely on a data lake and service catalog 240 to obtain attributes, profiles, skills and rankings for the agents that can be used to ensure that a worker requirement, if any, is met.

Figure 3:
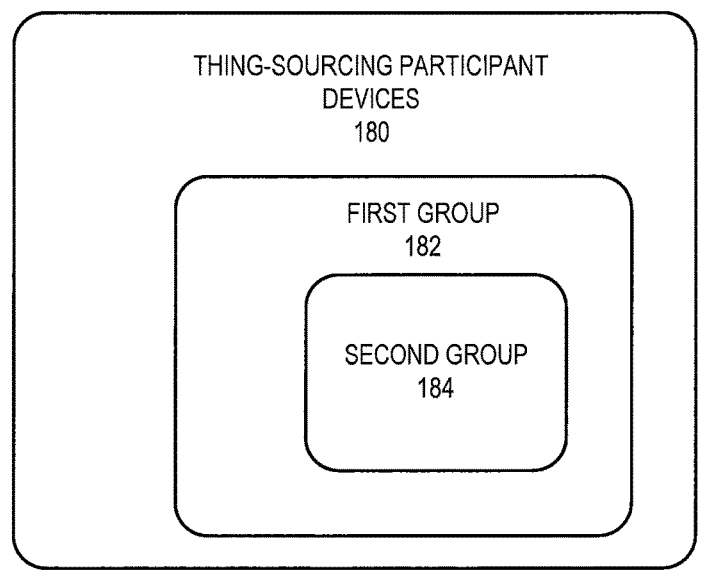
FIG. 3 schematically illustrates thing-sourcing participant devices including first and second groups thereof according to various embodiments described herein.

FIG. 3 illustrates the set 180 of all thing-sourcing participant devices 140 (agents) that are known to the thing-sourcing platform 110 and that are potentially available to provide data to the thing-sourcing platform 110 to perform a thing-sourcing task. In general, when a request to perform a thing-sourcing task is received by the thing-sourcing platform 110 from a requestor device 120, the thing-sourcing platform 110 determines which of the known agents are capable of providing the data that is needed to perform the task, i.e., which of the known agents meet the worker requirement for the task. This determination may be made based on attributes of the agents that may be stored in the data lake and service catalog 240. Such attributes may include the types of sensors available to each agent, the frequency with which the agent can provide data, the accuracy of the data provided by the agent, the cost of data provided by the agent, etc. For example, if a requestor device 120 requests thing sourcing data relating to vehicle traffic behavior at a given location, the thing-sourcing platform 110 may send a request only to those agents that include motion sensors and that are mobile.

The set of agents that respond to the request and that offer to provide data in response to the request are illustrated in FIG. 3 as the first group of agents 182. Since not all agents may be available to provide data, the first group of agents 182 is smaller than the set 180 of all agents that could potentially provide data needed to complete the thing-sourcing task. The thing-sourcing platform 110 may then select one or more agents from among the first group of agents 182 to actually perform the thing-sourcing task, e.g., to provide the data needed to complete the task. The selection of agents to perform the task may be based on one or more factors, such as cost, data quality, etc. The selected agents are illustrated in FIG. 3 as the second group 184, which is a subset of the first group 182.

Accordingly, in some embodiments, a thing-sourcing platform 110 may identify a set of conditions that are required to accomplish a given task, and may further identify subsets of the set of conditions that are satisfied by thing-sourcing participant devices in the first group of the thing-sourcing participant devices. The thing-sourcing platform 110 may then identify a second group of the thing-sourcing participant devices that can collectively accomplish the set of conditions. Thus, for example, the second group of selected agents may be able to collectively accomplish the set of conditions needed to accomplish the task.

Figure 4:
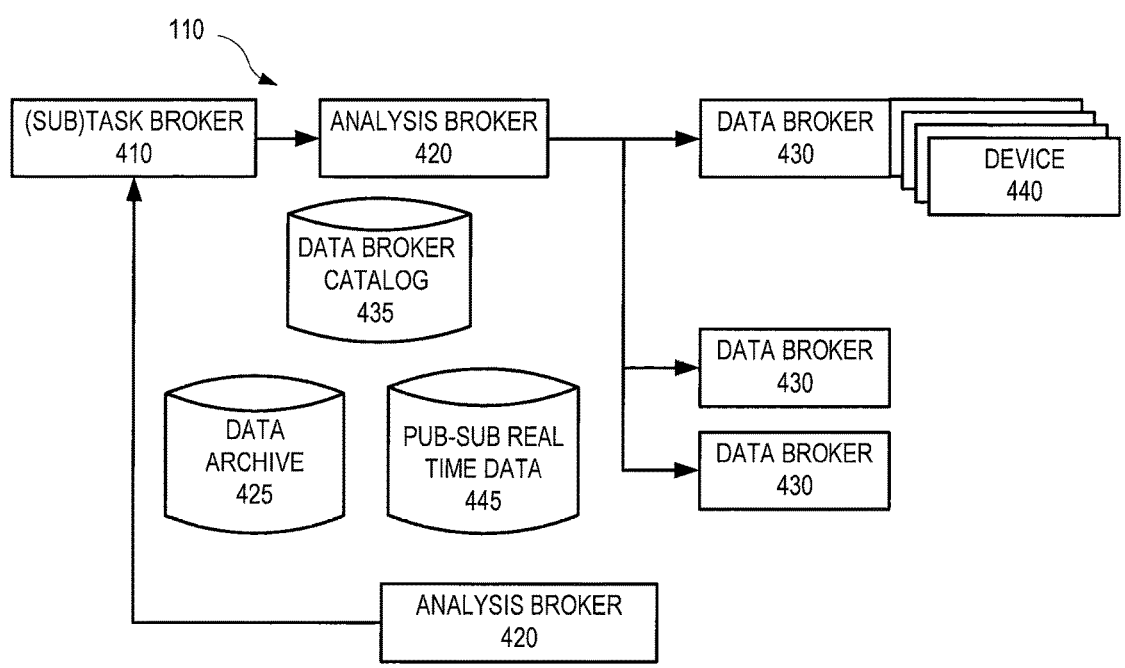
FIG. 4 is a block diagram that illustrates logical relationships among various broker modules according to various embodiments described herein.

FIG. 4 is a block diagram that generally illustrates various broker modules that may be provided in a thing-sourcing platform 110 according to some embodiments. The broker modules may implement one or more of the functional tasks performed by the thing-sourcing platform 110 as illustrated in FIG. 2. The broker modules, or brokers, may cooperatively perform defined tasks to analyze tasks and sub-tasks, and obtain data needed for each subtask from appropriate agents.

A thing-sourcing platform 110 according to some embodiments may subscribe to published events from selected thing-sourcing devices 140, as well as to requests from application composers and task brokers 110. The data collected through such subscriptions may be used to construct a map from tasks to instances of devices (that carry out the tasks) to the performance characteristics of the devices 140 in the context of these tasks.

For example, a task is received from a requestor device by a task broker 410. The task broker 410 generates templates that define how analysis brokers may combine previously obtained data and new data. The task broker 410 can further define a set of requirements for each type of data source. The requirements may include, for example, data subscription cost model (free, event frequency, duration), time frame, data confidence/quality, temporal alignment of data sources, weighting on current and archived data sources, constraints on over-sampling from the same devices, reliability in prior tasks, popularity of devices (e.g., how often specific device, device model, manufacturer, or data provider is requested), etc. The task brokers 410 may negotiate with the analysis brokers 420 to decide what data can be obtained and at what cost. The task broker 410 then delegates the task to one of a plurality of analysis brokers 420 to obtain and analyze the data, which may include real time data and/or non-real time data.

The analysis broker 420 determines if new real-time data is needed to complete the delegated task. If not, the analysis broker may obtain the data from a data archive 425 instead of requesting new real-time data from a device.

If the analysis broker 420 determines that new real-time data is required, the analysis broker 420 may send the task, or a data request associated with the task, to a data broker 430, which performs the operation of identifying and selecting one or more thing-sourcing participant devices 440 (i.e., agents) to provide the data. The data brokers may be identified in a data broker catalog 435 that is available to the analysis brokers 420.

Data from the data brokers 430 may be collected using a publication/subscription (pub/sub) model and stored in a pub-sub real time database 445, from which it can be accessed by the task broker 410.

The data brokers 430 obtain new real-time data from the devices 440. The analysis brokers 420 estimate, combine or model data based on prior and current values using an estimation technique.

It will be appreciated that analysis brokers 420 and data brokers 430 can be considered special cases of task brokers with constrained behaviors. Namely, analysis brokers subscribe to data brokers and transform data from multiple sources, including archived data, while data brokers represent raw data sources.

Figure 5:
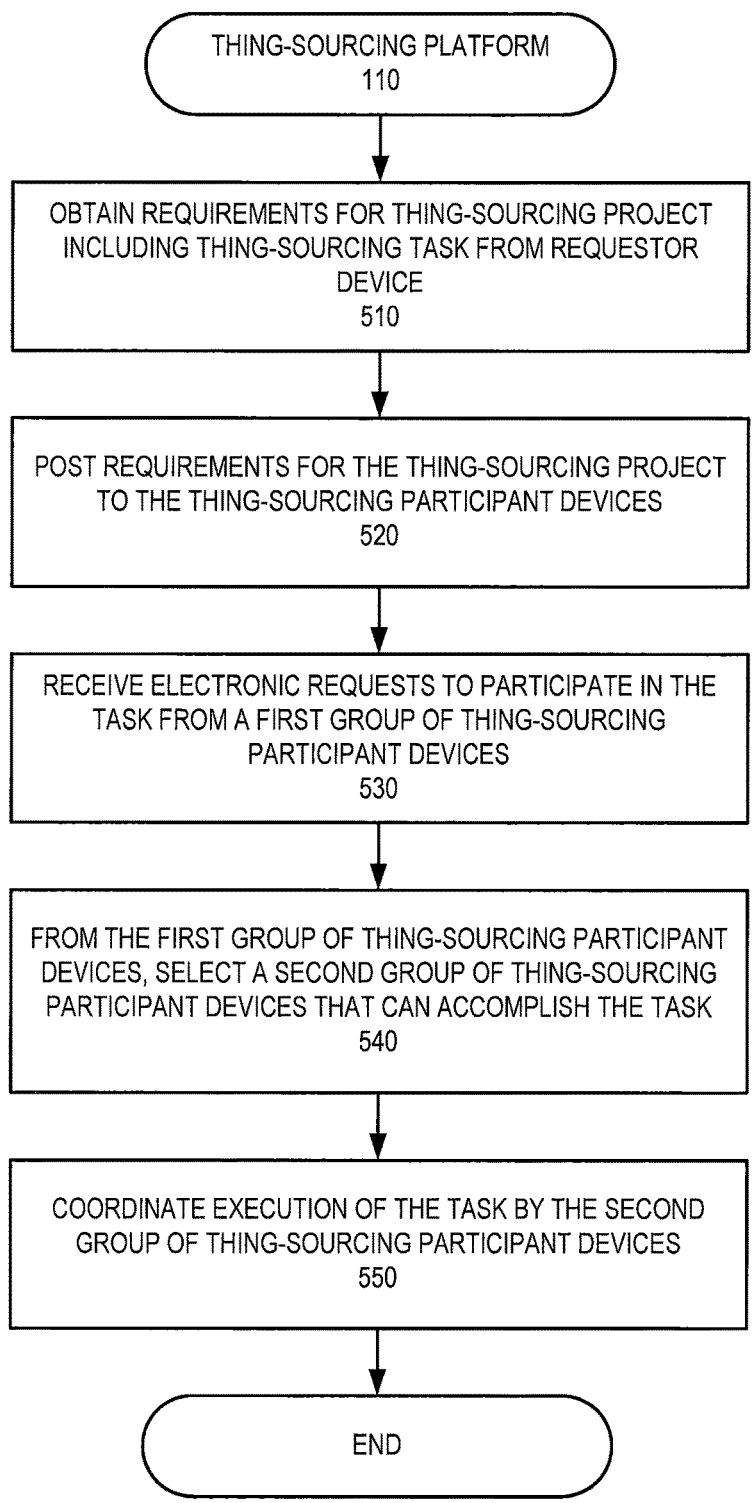
FIG. 5 is a flowchart of operations that may be performed by a thing-sourcing platform, such as the thing-sourcing platform of FIG. 1, according to various embodiments described herein.

FIG. 5 is a flowchart of general operations that may be performed by a thing-sourcing platform, such as the thing-sourcing platform 110 of FIG. 1 when data is to be obtained from agents. Referring to FIG. 5, at Block 510 requirements for thing-sourcing project that includes a thing-sourcing task are obtained from a requestor device, such as a requestor device 120 of FIG. 1, by the thing-sourcing platform 110 over the network 130. At Block 520, requirements for the thing-sourcing project are posted to the thing-sourcing participant devices 140 by the thing-sourcing platform 110. There may be many embodiments of posting. In some embodiments, the posting takes place at the thing-sourcing platform 110 itself and the thing-sourcing participant devices 140 access the thing-sourcing platform 110 over the network 130 to determine which thing-sourcing projects are available to them. In other embodiments, the thing-sourcing platform 110 may broadcast information about the thing-sourcing project to the participant devices 140 over the network 130. Combinations of these and other techniques may also be used. Referring briefly to FIG. 3, the set 300 indicates the set of thing-sourcing participant devices 140 to whom the requirements for the thing-sourcing project are posted at Block 520.

Referring again to FIG. 5, at Block 530, electronic requests to participate in the task are received from a first group of the thing-sourcing participant devices 140, labeled 310 in FIG. 3. A respective electronic request identifies a task or sub-task that can be accomplished by the respective thing-sourcing participant device 140.

Still referring to FIG. 5, a second group (labeled 320 in FIG. 3) of the thing-sourcing participant devices 140 is selected from the first group 310 of the thing-sourcing participant devices 140, at Block 540.

Finally, at Block 550, execution of the thing-sourcing project is coordinated using the second group 320 of the thing-sourcing participant devices 140 that can accomplish the task.

It will be understood that in FIG. 5, the selection of the second group 320 from the first group 310 at Block 540 is performed after receiving all of the requests from the first group 310 at Block 530. However, this need not be the case. Specifically, in some embodiments, the receiving of Block 530 and the selecting of Block 540 may overlap at least partially in time. Thus, for example, as the electronic requests are received from the first group 310 at Block 530, they may be evaluated for inclusion or exclusion in the second group 320. Then, once the second group 320 has been selected, further receiving of electronic requests from the first group 310 may be terminated. Thus, the selecting of the second group may 320 begin before all of the electronic requests to participate have been received from the first group 310.

It will also be understood that operations of Blocks 530, 540 and 550 may be performed by the data collection module 112 of FIG. 1 in some embodiments. In other embodiments however, only a subset of Blocks 530, 540 and/or 550 are performed by the data collection module 112, with the remaining operations being performed by other elements of the thing-sourcing platform 110.

Figure 6:
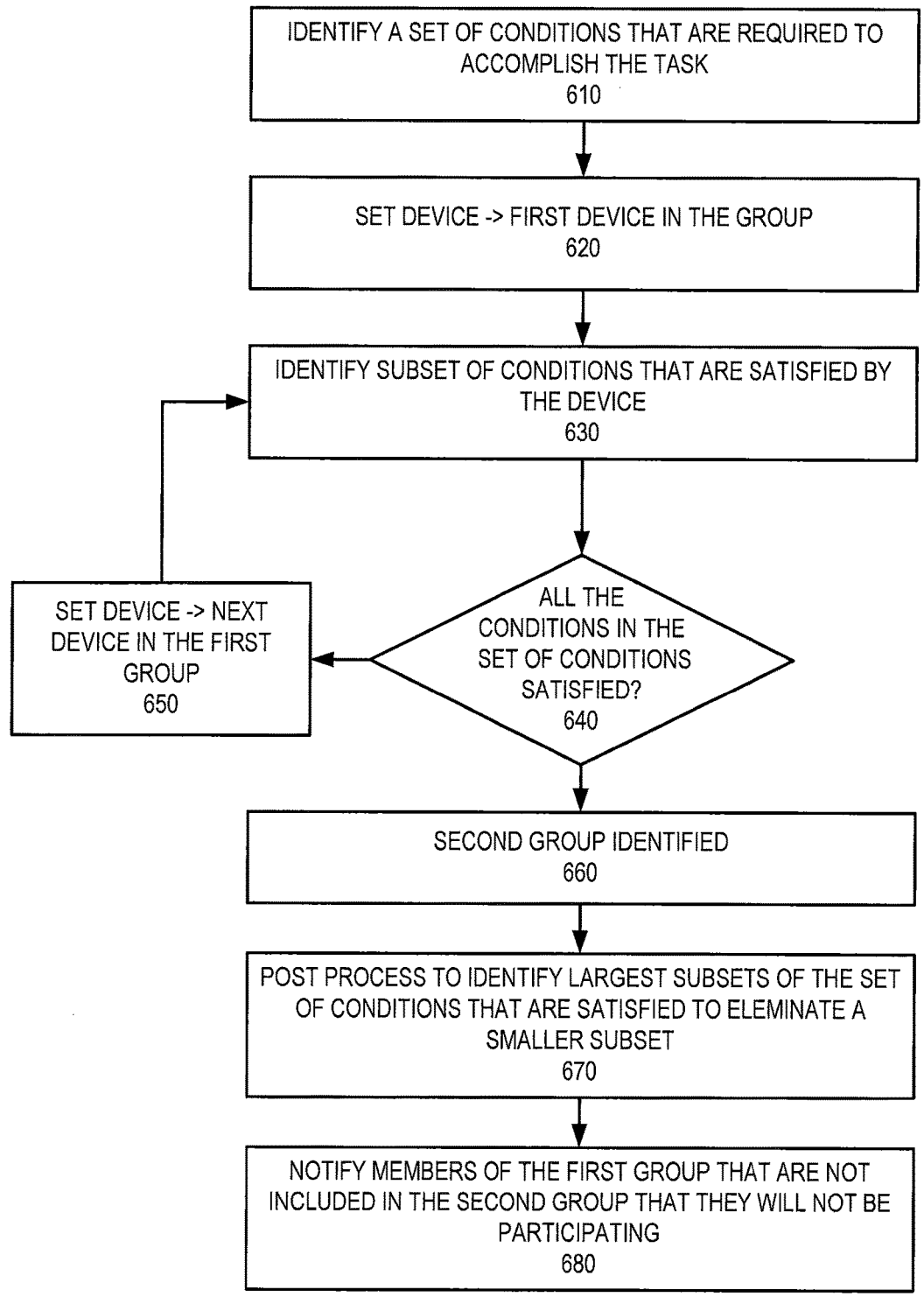
FIG. 6 is a flowchart of high-level operations of coordinated thing-sourcing according to various embodiments described herein.

FIG. 6 is a flowchart of operations that may be performed to select from the first group 182 of the thing-sourcing participant devices 140, a second group 184 of the thing-sourcing participant devices 140 that can collectively accomplish the task, according to various embodiments described herein, and may correspond to the operations of Block 540 of FIG. 5.

Referring to FIG. 6, at Block 610, a set of conditions that are required to accomplish the task is identified. The set of conditions may include requirements, qualifications and/or other criteria that are required to accomplish the task. At Block 620, a first device of the first group 182 is examined. At Block 630, a subset of the set of conditions that are satisfied by the first device is identified based on, for example, content of the electronic request that was received from the first device. A test is made at Block 640 as to whether all of the conditions in the set of conditions have been satisfied by the device(s) that have been examined at Blocks 620 and 630. If not, the next device in the first group 182 is examined at Block 650, and the operations of Blocks 630, 640 and 650 continue to be performed until all of the conditions in the set of conditions have been satisfied at Block 640. This indicates that the second group 184 has been identified at Block 660.

The operations of Block 640 may keep track of a "best offer" so far and/or keep a sorted list of received device offerings, so that if nothing better is available, the request conditions can be downgraded, if necessary. This may depend on how the conditions are specified at Block 610. For example, some conditions may provide a desired degree of precision and/or a desired time of completion. If, after this time of completion, no feasible subgroup can provide the information, the precision constraint may be dropped or relaxed. Moreover, if no group can provide the required precision, traditional crowd-sourcing may be used to try to collect equivalent results.

Accordingly, various operations illustrated in FIG. 6 can identify respective subsets of the set of conditions that are satisfied by respective thing-sourcing participant devices in the first group 182 of the thing-sourcing participant devices 140 based on the respective portions of the task identified in the respective electronic requests, to identify the second group 184 of the thing-sourcing participant devices 140 that can collectively accomplish the set of conditions even though none of the second group 184 of the thing-sourcing participant devices 140 can accomplish the set of conditions individually. FIG. 6 also illustrates embodiments wherein the identifying respective subsets comprises identifying a subset of the set of conditions that is satisfied by a given device in the first group 182 of the thing-sourcing participant devices 140 (Block 630), determining whether the set of conditions is satisfied by the given device and any previously identified device(s) in the first group 182 of the thing-sourcing participant devices 140 (Block 640), and performing the identifying (Block 630) and the determining (Block 640) for additional participant devices (Block 650) in the first group 182 of the thing-sourcing participant devices 140, until the second group 184 of the thing-sourcing participant devices 140 has been identified (Block 660).

Moreover, as illustrated in FIG. 6 at Block 660, the identifying respective subsets is terminated in response to the second group 184 of the thing-sourcing participant devices 140 being identified, even though the conditions that are satisfied by all of the first group 182 of the thing-sourcing participant devices 140 have not yet been identified. In other embodiments, however, the thing-sourcing participant devices 140 can continue to be examined, for example to determine if a single device may be found later that can satisfy the entire task.

Still referring to FIG. 6, at Block 670, post-processing may be performed to identify largest subsets of the set of conditions that are satisfied by the respective thing-sourcing participant device in the first group 182 of the thing-sourcing participant devices 140, to eliminate member(s) of the second group 184 of the thing-sourcing participant devices 140 that can only satisfy smaller subset(s) of the set of conditions. For example, the second group 184 that was identified in Block 660 may include ten participants who collectively can satisfy all of the conditions in the set of conditions that are required to accomplish the task, even though none of the second group 184 of the thing-sourcing participant devices 140 can accomplish the set of conditions individually. However, further analysis of the second group 184 may determine that two of the ten members of the second group 184 only accomplish a small number of the tasks, and these tasks are also accomplished by the eight other members of the second group 184. Thus, these two members of the second group 184 can be eliminated and the remaining eight members of the second group 184 can still collectively accomplish the set of conditions.

Finally, optionally, at Block 680 the members of the first group 182 of the thing-sourcing participant devices 140 that are not included in the second group 184 of the thing-sourcing participant devices 140 may be notified that they will not be participating in the thing-sourcing project. Notification may take place by broadcasting by the thing-sourcing platform 110 and/or by posting at the thing-sourcing platform 110.

Figure 7:
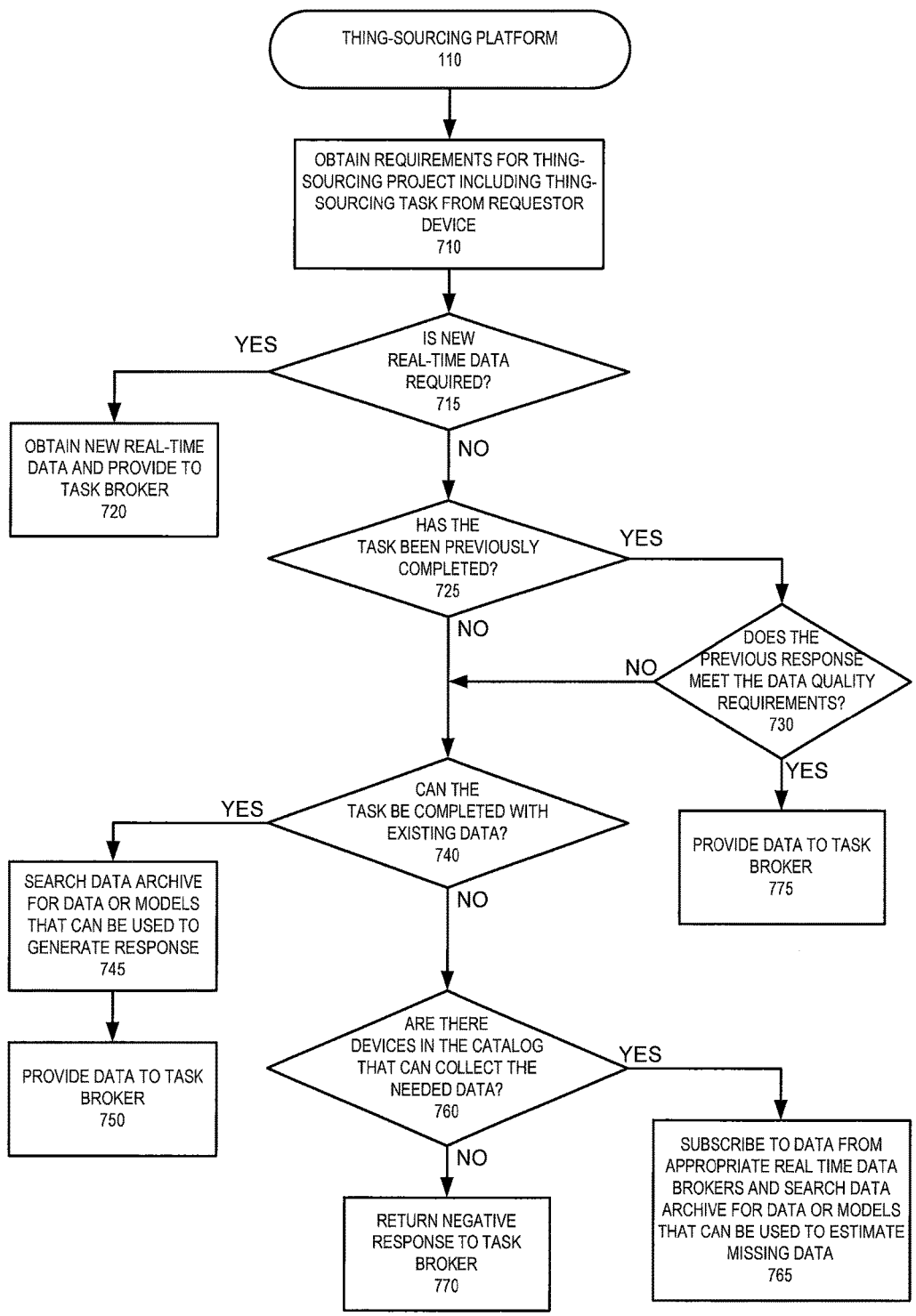
FIG. 7 is a flowchart of operations that may be performed to determine what data need to be collected according to various embodiments described herein.

FIG. 7 illustrates operations according to some embodiments in which stored non-real time data, or near-real time data, may be used to complete a thing-sourcing task instead of newly obtained real time data. In some cases, newly requested thing-sourcing tasks can be matched to one or more previously performed tasks, and the data obtained in a previously performed task can be used to complete a new task.

Moreover, in some embodiments, previously obtained data can be used to generate hybrid responses to the new task in which some of the results returned to the task broker are real-time and some are estimates based on recent, but non-real time data.

Referring to FIG. 7, operations begin at Block 710 when the thing-sourcing platform 110 receives a request from a requestor device 120 to perform a thing-sourcing project including a thing-sourcing task. The request includes requirements for the thing sourcing task, such as data that is needed to complete the project.

The thing-sourcing platform determines at Block 715 if new real time data is required to complete the task. In particular, the determination if new real-time data is needed may be made by an analysis broker 420 illustrated in FIG. 4. If it is determined at Block 715 that new real-time data is required, the analysis broker 420 instructs a data broker 430 to obtain the new real-time data from one or more devices, for example, using the process illustrated in FIG. 5. The obtained data is then returned to the task broker 410 that ordered the data. Operations associated with obtaining new real-time data are illustrated in more detail in FIG. 8, described below.

Referring again to FIG. 7, if it is determined at Block 715 that new real-time data is not required in order to complete the task, then operations proceed to Block 725 to determine if the task has been previously completed. In particular, the analysis broker 420 to which the task was delegated may consult the data archive 425 to determine if there is previously generated data that would be responsive to the task request.

If there is data in the archive that would be responsive to the task request, operations proceed to Block 730, where the analysis broker 420 determines if the previously obtained data meets the data quality requirements of the project. Examples of data quality requirements include data sampling requirements, data aging requirements, data accuracy requirements, etc. There may also be a cost associated with using the stored data.

If the previously obtained non real-time data meets the data quality requirements, the data is provided to the task broker 410. The task broker 410 can then assemble the data from all related sub-tasks, generate a response to the task request, and return the response to the requestor device.

If it is determined at Block 725 that the task has not been previously completed, or that the previously obtained data does not meet the data quality requirements specified for the task, operations then proceed to Block 740, where the analysis broker 420 determines if the task can be completed using the existing data. For example, in some cases, it may be possible to generate data responsive to the task request by extrapolating the existing data, or as the output of a model that operates on existing data. If it is determined at block 740 that the task can be completed using existing data, the analysis broker 20 searches the data archive at Block 745 for data that can be used to generate a response and/or for models from which the responsive data can be generated. The data that is extracted and/or output by the models is then provided to the task broker 410. The task broker 410 can then assemble the data from all related sub-tasks, generate a response to the task request, and return the response to the requestor device.

If it is determined at Block 740 that the task cannot be completed with existing data, then the analysis broker proceeds to obtain new real time data from the available agents if possible. In particular, at Block 760, the analysis broker determines if there are agents listed in the data lake and service catalog 740 (FIG. 2) that can provide the requested data. If not, a negative response is returned to the requestor device at Block 770. If there are agents available to provide the requested data, then the analysis broker 420 subscribes to one or more data brokers 430 at Block 765. The analysis broker 420 may, at the same time, search the data archive 425 for previously obtained data or models that can be used to estimate or complement missing, incomplete or unreliable data provided by the data brokers 430.

In FIG. 7, data management is composed of several elements, including a catalog of skills where entities can publish or subscribe, depending on whether they are interested in publishing a task for other to solve, or solve tasks that require the given set of data or event streams. This catalog as described above is constantly updated with new performance data and application to services to devices to performance mappings. In addition, there is a real time data repository. This repository subscribes to all of the data subscribed to by all of the analysis brokers and is used by these brokers as their data repository. The data archive subscribes to the data published by the data brokers, and is a repository for the data created by the analysis brokers.

Some tasks can be addressed with existing archived models and data, and some tasks that require real-time (new) data can use archived models and data to estimate or supplement impoverished data. The invention provides a system and method for managing how archived data can be applied to new tasks and queries.

To determine if the archive or real-time data sources can provide the appropriate data, the catalog will retain descriptions of prior tasks and the mapping from these task descriptions to the devices used to fulfill the task and to the data collected in fulfillment of the task. The data will be tagged with source meta-data (time/date, gps origin, device, owner, restrictions on use). The catalog will also contain the available device known to the system. Moreover, the platform will know at any point in time, how many devices can fulfill a particular request, so that the available data types and device publication schedules are known.

Determining which prior tasks are related to the current task or which prior data collections could be used in a current task can be accomplished by clustering tasks (and subtasks) using standard natural language processing techniques and clustering algorithms. This will provide a mapping from similar tasks (or subtasks) to the data used to satisfy those tasks (or subtasks). Alternatively, natural language processing techniques can be used to decompose a task (or subtask) in order to determine the appropriate data collection requirements).

The data collection strategy that is generated by the above methods, can be reviewed and modified by the user who is requesting the task. For example, the user can permit or reject the use of a particular, archived data set, or might choose among several alternative data sets.

Figure 8:
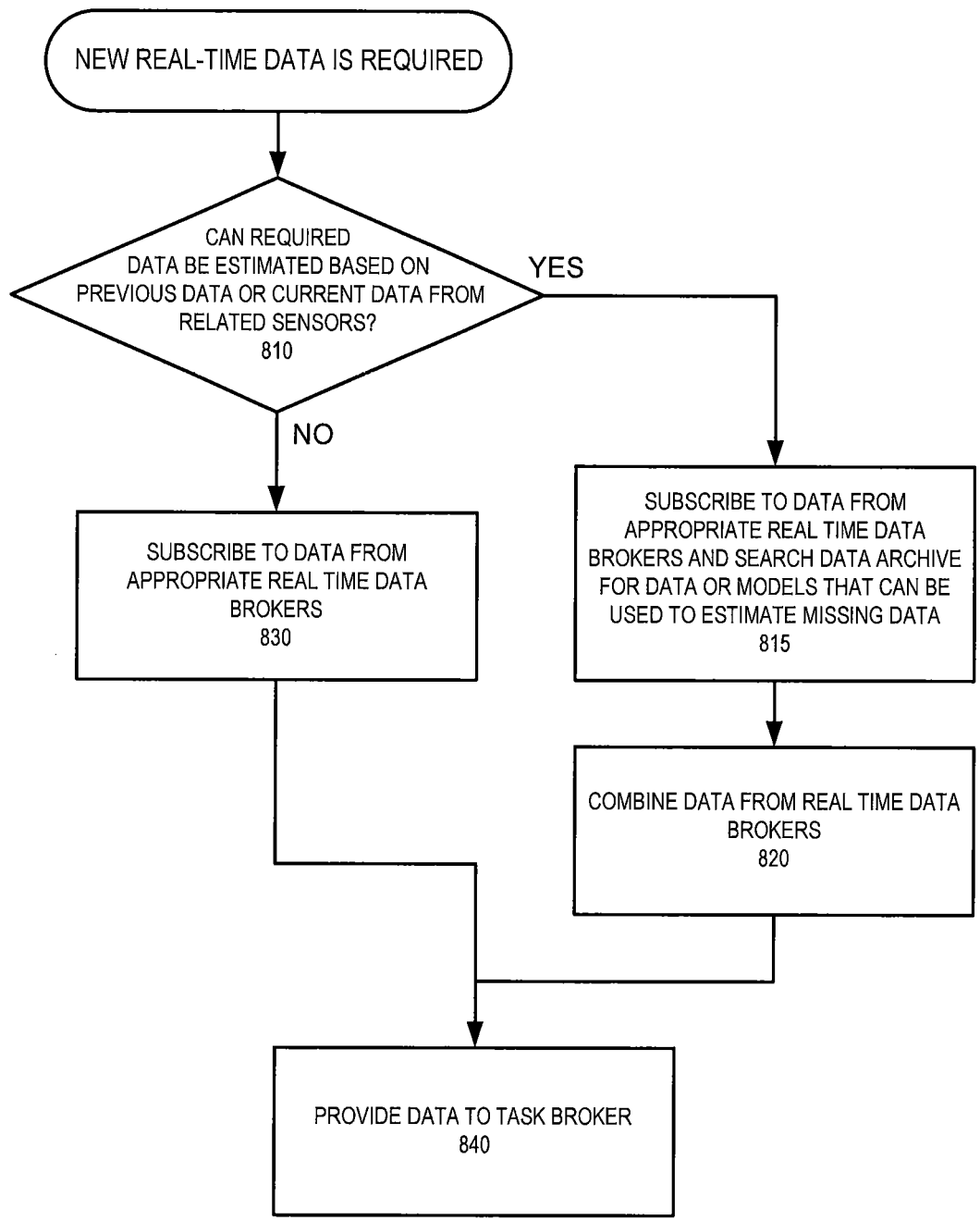
FIG. 8 is a flowchart of operations that may be performed when new real time data is required according to various embodiments described herein.

Referring to FIG. 8, if it is determined at Block 315 of FIG. 7 that new real-time data is required, operations may proceed to Block 810 of FIG. 8, where the analysis broker 420 determines if the required data can be estimated based on previously obtained data or from new-real time data that is related to the required data, such as data from related agents. If the answer is negative, the operations proceed to Block 830, where the analysis broker 420 subscribes to data from the appropriate real-time data brokers 430 as described above. The data provided by the real-time data brokers 430 is then provided to the task broker 410. The new real-time data and associated metadata may be stored in the real-time data storage 445 where it can be accessed by the task broker 410. The new real-time data and associated metadata may also be stored in the data archive 425 for future use.

If it is determined at Block 810 that the requested data can be obtained based on previous or related data, operations proceed to Block 815, where the analysis broker 420 subscribes to data from the appropriate real-time data brokers 430 and also searches the data archive 425 for previously obtained data or models that can be used to estimate or complement any missing, incomplete or unreliable data provided by the data brokers 430. The new real time data provided by the data brokers 430 may then be combined with any related data obtained from the data archive 425 (which may be processed or otherwise filtered using one or more models obtained from the data archive 425), and a hybrid response including both the new real-time data and the archived data is provided to the task broker 410 at Block 840.

Figure 9:
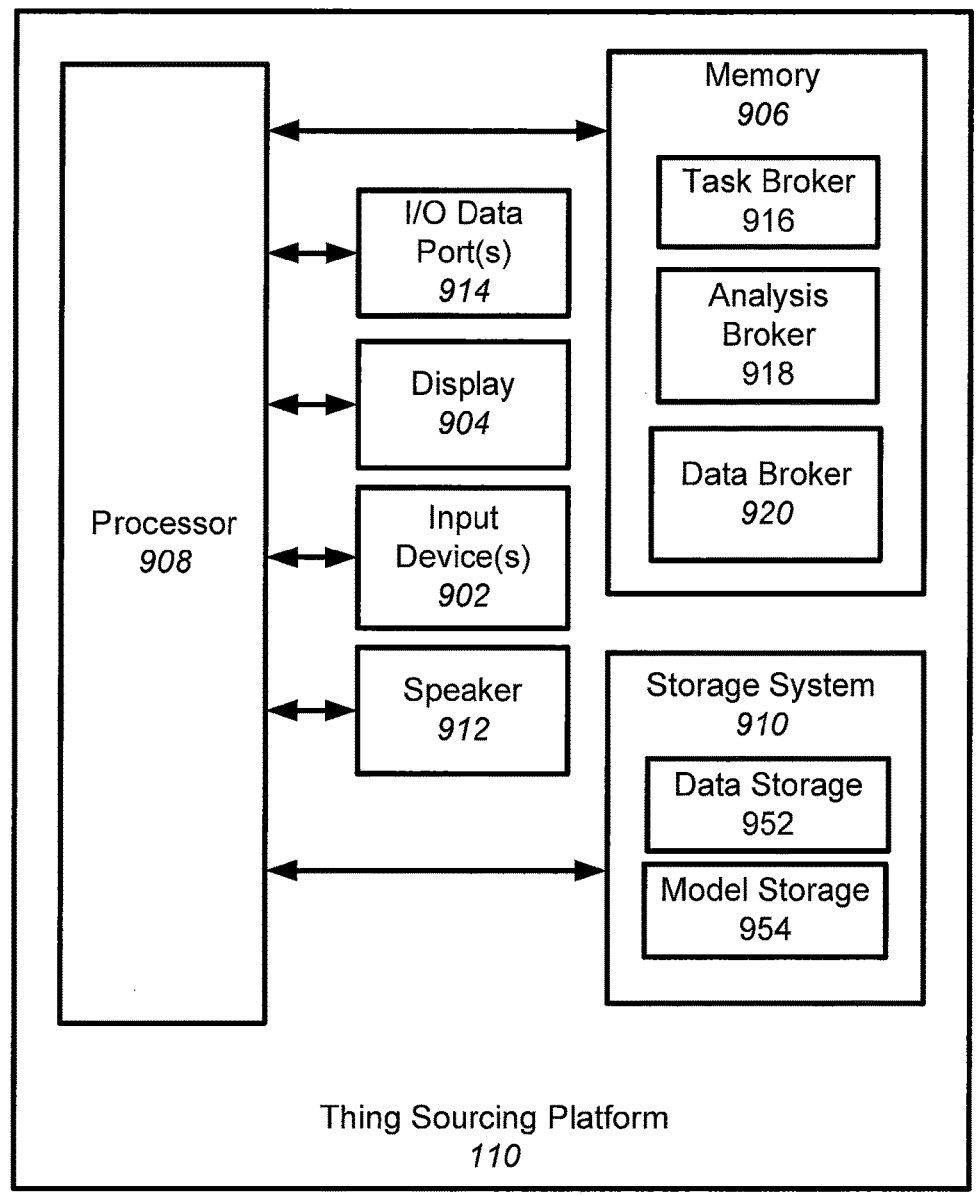
FIG. 9 is a block diagram of a thing sourcing platform that is configured according to various embodiments described herein.

FIG. 9 is a hardware block diagram of a thing-sourcing platform 110 that may be configured to have the features illustrated in FIGS. 1, 2 and/or 4. FIG. 9 illustrates aspects of a thing sourcing platform 110 according to some embodiments. The thing sourcing platform 110 includes a processor 908 that communicates with a memory 906, a storage system 910, and one or more I/O data ports 914. The thing-sourcing platform 110 may also include a display 904, an input device 902 and a speaker 912. The memory 906 stores program instructions and/or data that configure the thing sourcing platform 110 for operation. In particular, the memory 906 may store a task broker module 916, an analysis broker module 918 and a data broker module 920. The task broker module 916, analysis broker module 918 and data broker module 920 may be used to instantiate the task brokers 410, analysis brokers 420 and data brokers 430 shown in FIG. 4, respectively.

The storage system 910 may include, for example, a hard disk drive or a solid state drive, and may store the data archive 425, data broker catalog 435 and real-time data 445 shown in FIG. 4.

EXAMPLE

The following example shall be regarded as merely illustrative and shall not be construed as limiting.

A mobility application may require collecting environmental data to provide recommendations to the inhabitants of a particular city related to the best way to go from a point A in the city to a point B in the same city. Different alternatives may include using public transportation, a private vehicle or even a shared vehicle system. In order to make a recommendation for the best way to go, a thing-sourcing task may be defined to obtain data regarding current traffic conditions along a route from point A to point B. The mobility application may be connected to a thing-sourcing platform to collect the information required to provide recommendations. For instance, at development time, application developers may generate tasks in the form of data queries to be posted in the thing-sourcing platform. One task performed by the mobility application may involve asking to available device information about the speed of traffic along various parts of the route.

At development time, it is not known what, if any agents may be available that can provide information about traffic speed. When the request for traffic data is received at the thing-sourcing platform from the mobility application, the request is passed to a task broker in the thing-sourcing platform. The task broker passes the request to an analysis broker which determines if new real-time data is needed. In this case, while real-time data may be preferred, real-time data may not be available for every point on the route. However, there may be non real-time data, such as recently obtained data, that can be used to generate a response, or other real-time data, such as nearby data, from which responsive data can be extrapolated. Thus, the analysis broker may determine if the previously obtained data meets the data quality requirements of the request, and if so, collect new real-time data from available agents where possible and combine the real-time data with the previously obtained data for use in generating a response to the request.

FURTHER DEFINITIONS AND EMBODIMENTS

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

The description herein has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed:

1. A method performed by a computing device operating in an electronic communication network, the computing device including a processor and a communication interface, the method comprising:
    receiving, at the communication interface, a thing-sourcing project request from a requestor device over the electronic communication network, the thing-sourcing project request including requirements for a thing-sourcing task that requires data input by a thing-sourcing device operating in the electronic communication network;
    determining whether real-time data is needed in order to complete the thing-sourcing task;
    in response to determining that real-time data is not needed in order to complete the thing-sourcing task, determining whether a similar thing-sourcing task has been previously completed;
    in response to determining that the similar thing-sourcing task has not been previously completed, determining whether the thing-sourcing task can be completed using pre-existing data;
    in response to determining that the thing-sourcing task can be completed using pre-existing data, searching a data archive for relevant pre-existing data that can be used to complete the thing-sourcing task;
    completing the thing-sourcing task using the relevant pre-existing data; and
    transmitting a response to the thing-sourcing project request to the requestor device over the electronic communication network.

2. The method of claim 1, wherein the pre-existing data comprises data obtained from other data collection/estimation tasks.

3. The method of claim 1, wherein determining whether real-time data is required in order to complete the thing-sourcing task comprises determining whether new real-time data is required in order to complete the thing-sourcing task.

4. The method of claim 1, further comprising:
    in response to determining that real-time data is needed in order to complete the thing-sourcing task:
    posting requirements for the thing-sourcing task to thing-sourcing participant devices over the electronic communication network;
    receiving from a first group of the thing-sourcing participant devices over the electronic communication network, electronic requests to participate in the thing-sourcing task;
    selecting from the first group of the thing-sourcing participant devices, a second group of the thing-sourcing participant devices that can collectively accomplish the thing-sourcing task;
    coordinating execution of the thing-sourcing task by the second group of the thing-sourcing participant devices;
    receiving new real-time data from the second group of the thing-sourcing participant devices as a result of execution of the thing-sourcing task;
    generating a response to the thing-sourcing project request using the new real-time data received from the second group of thing-sourcing participant devices; and
    transmitting the response to the requestor device over the electronic communication network.

5. The method of claim 4:
    wherein posting the requirements for the thing-sourcing task is performed by a thing-sourcing platform that is connected to the thing-sourcing participant devices by the electronic communication network,
    wherein receiving the electronic requests to participate in the thing-sourcing task is performed by the thing-sourcing platform in response to the electronic requests that are received by the thing-sourcing platform from the first group of the thing-sourcing participant devices over the electronic communication network,
    wherein the selecting is performed by the thing-sourcing platform, and
    wherein the coordinating is performed by the thing-sourcing platform.

6. The method of claim 4, wherein selecting the second group of thing-sourcing devices comprises:
    identifying a set of conditions that are required to accomplish the task; and
    identifying respective subsets of the set of conditions that are satisfied by respective thing-sourcing participant devices in the first group of the thing-sourcing participant devices, to identify the second group of the thing-sourcing participant devices that can collectively accomplish the set of conditions.

7. The method of claim 1, further comprising:
    in response to determining that the thing-sourcing task has been previously completed:
    identifying previously generated data that was generated in a previous execution of the thing-sourcing task;
    obtaining data sampling requirements for the thing-sourcing task;
    determining if the previously generated data was generated in accordance with the data sampling requirements for the thing-sourcing task; and in response to determining that the previously generated data was generated in accordance with the data sampling requirements for the thing-sourcing task, generating a response to the thing-sourcing project request using the previously generated data, and transmitting the response to the requestor device over the electronic communication network.

8. The method of claim 1, further comprising:
in response to determining that the task cannot be completed using pre-existing data, determining if at least one thing-sourcing participant device is available that can collect data needed to complete the thing-sourcing task.

9. The method of claim 8, further comprising:
in response to determining that at least one thing-sourcing participant device is available that can collect data needed to complete the thing-sourcing task:
posting requirements for the thing-sourcing task to a plurality of thing-sourcing participant devices;
receiving data from at least one of the plurality of thing-sourcing participant devices as a result of execution of the thing-sourcing task;
generating a response to the thing-sourcing project request using the data provided by the at least one of the plurality of thing-sourcing participant devices; and
transmitting the response to the requestor device over the electronic communication network.

10. The method of claim 8, further comprising:
in response to determining that nothing-sourcing participant device is available that can collect data needed to complete the thing-sourcing task, generating a negative response to the thing-sourcing project request and transmitting the negative response to the requestor device over the electronic communication network.

11. The method of claim 1, further comprising:
in response to determining that real-time data is required in order to complete the thing-sourcing task:
determining whether the required real-time data can be estimated based on previously-generated data;
in response to determining that the required data can be estimated based on previously-generated data:
searching a data archive for pre-existing data that can be used to complete the thing-sourcing task;
obtaining new real-time data from thing-sourcing participant devices;
combining the pre-existing data with the new real-time data;
generating a response to the thing-sourcing project request using the combined new real-time data and pre-existing data; and
transmitting the response to the requestor device over the electronic communication network.

12. The method of claim 1, further comprising:
in response to determining that real-time data is required in order to complete the thing-sourcing task:
determining whether the required real-time data can be estimated based on related real-time data that is related to the required real-time data and that can be obtained from thing-sourcing participant devices;
in response to determining that the required real-time data can be estimated based on the related real-time data:
obtaining the related real-time data from the thing-sourcing participant devices;
generating the required real-time data from the related real-time data;
generating a response to the thing-sourcing project request using the required real-time data that is generated from the related real-time data; and
transmitting the response to the requestor device over the electronic communication network.

13. The method of claim 1:
wherein at least one of the thing-sourcing participant devices comprises a user device that communicates with the thing-sourcing platform over the electronic communication network in response to a user input; and
wherein at least one of the thing-sourcing participant devices comprises an electronic device that automatically communicates with the thing-sourcing platform over the electronic communication network.

14. The method of claim 13, wherein the electronic device automatically communicates with the thing-sourcing platform over the network using a software agent that is configured to negotiate with the thing-sourcing platform, the portion of the task that can be accomplished by the electronic device.

15. The method of claim 13, wherein the electronic device comprises a thing in an Internet of Things (IoT); and the method further comprising:
in response to determining that real-time data is required in order to complete the thing-sourcing task:
coordinating execution of the thing-sourcing task by a group of thing-sourcing participant devices over the electronic communication network;
receiving real-time data from the group of the thing-sourcing participant devices as a result of execution of the thing-sourcing task;
generating a response to the thing-sourcing project request using the real-time data provided by the group of thing-sourcing participant devices.

16. A computer program comprising:
a computer readable non-transitory storage medium having computer readable program code embodied in the non-transitory storage medium, that is executable to cause a computer system operating in an electronic communication network to perform operations comprising:
receiving, over the electronic communication network, a thing-sourcing project request from a requestor device, the thing-sourcing project request including requirements for a thing-sourcing task that requires data input by a thing-sourcing device operating in the electronic communication network;
determining whether real-time data is needed in order to complete the thing-sourcing task;
in response to determining that real-time data is not needed in order to complete the thing-sourcing task, determining whether a similar thing-sourcing task has been previously completed;
in response to determining that the similar thing-sourcing task has not been previously completed, determining whether the thing-sourcing task can be completed using pre-existing data;
in response to determining that the thing-sourcing task can be completed using pre-existing data, searching a data archive for relevant pre-existing data that can be used to complete the thing-sourcing task;
completing the thing-sourcing task using the relevant pre-existing data; and
transmitting a response to the thing-sourcing project request to the requestor device over the electronic communication network.

17. The computer readable program of claim 16, wherein the operations further comprise:
  in response to determining that real-time data is required in order to complete the thing-sourcing task:
    posting requirements for the thing-sourcing task to thing-sourcing participant devices over the electronic communication network;
    receiving from a first group of the thing-sourcing participant devices over the electronic communication network, electronic requests to participate in the thing-sourcing task;
    selecting from the first group of the thing-sourcing participant devices, a second group of the thing-sourcing participant devices that can collectively accomplish the thing-sourcing task;
    coordinating execution of the thing-sourcing task by the second group of the thing-sourcing participant devices;
    receiving real-time data from the second group of the thing-sourcing participant devices as a result of execution of the thing-sourcing task;
    generating a response to the thing-sourcing project request using the real-time data provided by the second group of thing-sourcing participant devices; and
    transmitting the response to the requestor device over the electronic communication network.

18. The computer readable program of claim 16, wherein the operations further comprise:
  in response to determining that the thing-sourcing task has been previously completed:
    identifying previously generated data that was generated in a previous completion of the thing-sourcing task;
    obtaining data sampling requirements for the thing-sourcing task;
    determining if the previously generated data was generated in accordance with the data sampling requirements for the thing-sourcing task; and
    in response to determining that the previously generated data was generated in accordance with the data sampling requirements for the thing-sourcing task, generating a response to the thing-sourcing project request using the previously generated data, and transmitting the response to the requestor device over the electronic communication network.

19. A computer system comprising:
  a processor; and
  a memory coupled to the processor, the memory comprising computer readable program code embodied therein that is executable to cause the computer system operating within an electronic communication network to perform operations comprising:
    receiving, over the electronic communication network, a thing-sourcing project request from a requestor device, the thing-sourcing project request including requirements for a thing-sourcing task that requires data input by a thing-sourcing device operating in the electronic communication network;
    determining whether real-time data is needed in order to complete the thing-sourcing task;
    in response to determining that real-time data is not needed in order to complete the thing-sourcing task, determining whether a similar thing-sourcing task has been previously completed;
    in response to determining that the similar thing-sourcing task has not been previously completed, determining whether the thing-sourcing task can be completed using pre-existing data;
    in response to determining that the thing-sourcing task can be completed using pre-existing data, searching a data archive for relevant pre-existing data that can be used to complete the thing-sourcing task;
    completing the thing-sourcing task using the relevant pre-existing data; and
    transmitting a response to the thing-sourcing project request to the requestor device over the electronic communication network.

20. The computer system according to claim 19, wherein the operations further comprise:
  in response to determining that real-time data is required in order to complete the thing-sourcing task:
    posting requirements for the thing-sourcing task to thing-sourcing participant devices over the electronic communication network;
    receiving from a first group of the thing-sourcing participant devices over the electronic communication network, electronic requests to participate in the thing-sourcing task;
    selecting from the first group of the thing-sourcing participant devices, a second group of the thing-sourcing participant devices that can collectively accomplish the thing-sourcing task;
    coordinating execution of the thing-sourcing task by the second group of the thing-sourcing participant devices;
    receiving real-time data from the second group of the thing-sourcing participant devices as a result of execution of the thing-sourcing task;
    generating a response to the thing-sourcing project request using the real-time data provided by the second group of thing-sourcing participant devices; and
    transmitting the response to the requestor device over the electronic communication network.

* * * * *